(No Model.)
M. W. NEEDHAM.
CAR COUPLING.
No. 507,685. Patented Oct. 31, 1893.
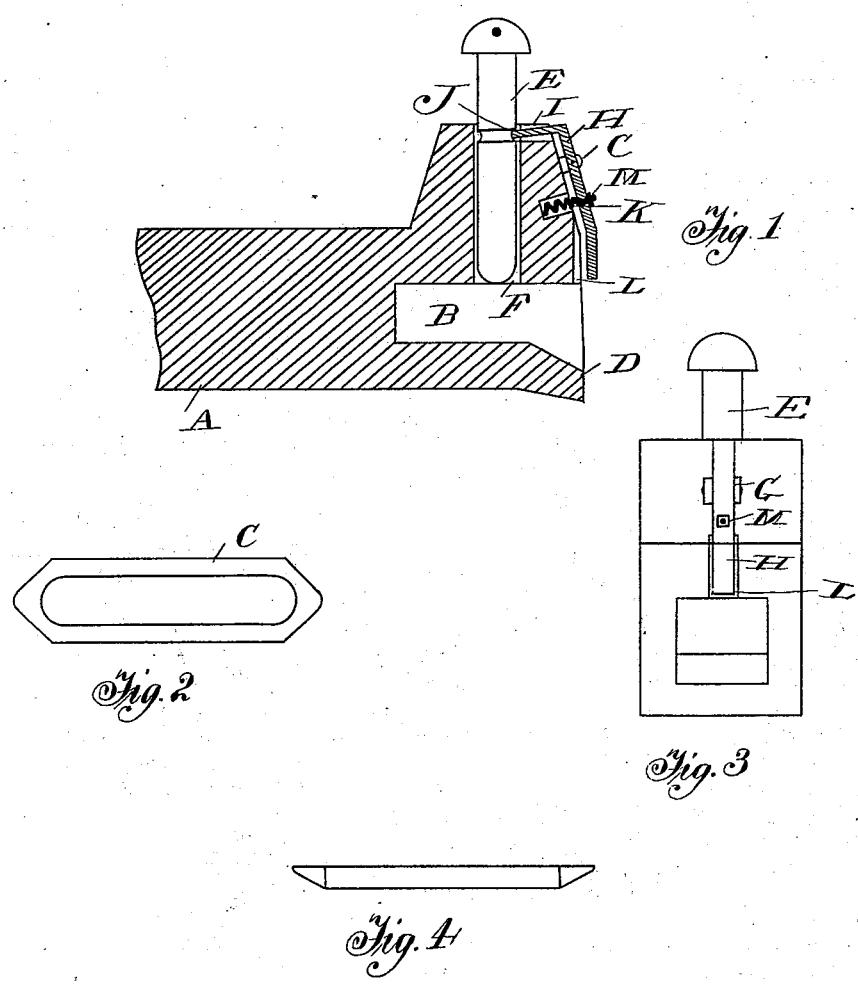
Witnesses
Geo. T. Kincaid.
Gene L. Williams.
Inventor
Moses W. Needham,
by John Wedderburn
his Attorney

UNITED STATES PATENT OFFICE.

MOSES W. NEEDHAM, OF LINCOLN, TERRITORY OF NEW MEXICO.

CAR-COUPLING.

SPECIFICATION forming part of Letters Patent No. 507,685, dated October 31, 1893.

Application filed September 17, 1892. Serial No. 446,144. (No model.)

*To all whom it may concern:*

Be it known that I, MOSES W. NEEDHAM, of Lincoln, in the county of Lincoln and Territory of New Mexico, have invented certain new and useful Improvements in Car-Couplings; and I do hereby declare the following to be a full, clear, and exact description of the invention, such as will enable others skilled in the art to which it appertains to make and use the same.

My invention relates to improvements in that class of car-couplings commonly known as link and pin couplings, and is designed for greater simplicity of construction and certainty of operation, while its adoption will eliminate all or nearly all danger to the operator.

I have set forth fully hereinafter the details of construction and the essential features of my invention and illustrated them in the accompanying drawings in which—

Figure 1 is a transverse section of the coupling. Fig. 2 is a plan view of the link, and Fig. 3 is an end view of the draw head. Fig. 4 is a side view of the link.

A is the drawhead which has its throat beveled, and the mouth B into which the link C enters is provided with its under side D inclined, adapted to receive the link at whatever height it is presented and so guide it into the mouth of the draw-head. The link C is pointed at its entering end and is also cut away on its under surface, so as to form a basil edge or point.

The link C is secured to the draw-head A by means of the pin E, and the novel manner of securing the pin in the required position, and at the same time releasing the pin when desired, is one of the principal points and advantages of my invention. In the upper part of the draw-head is the pin hole F which is elliptical in cross section and into which the pin whose cross section is elliptical is intended to pass.

Pivoted in a bearing (G) on the outer surface of the draw-head is a lever (H) which is bent at its upper end and adapted to pass through the hole (I) and into the notch (J) in the pin. Below the bearing (G) I have constructed a spiral spring (K), one end of which rests in a recess (L) in the draw-head, while its other end is secured to the lever (H) by means of the nut (M).

The operation of my car-coupler is as follows: Before the cars are united the pin (E) is placed in the position shown in Fig. 1, the bent lever (H) holding it in position; when the draw-heads of the cars come in contact, the link passes into the mouth (B), and the draw-head into which is previously secured the link comes in contact with the lower end of the lever (H), thus forcing it inward and thereby disengaging its upper end from recess (J) and allowing the pin (E) to fall into the opening in the link.

In order to allow the lever to lie flush with the outer surface of the draw-head I have supplied a groove (N).

The position of the lever (H) and pin (E) after the cars are coupled is shown in the dotted lines in Fig. 1.

The construction, arrangement and mode of operation of my coupling being thus made known, the advantages of the same will, it is thought be readily understood.

I claim—

In a car coupling the combination of a draw-head, A, with an upper extension having a vertical pin opening therein and the top front portion thereof also formed with an opening, I, which is an angular extension of a lower face opening or air recess, L, in line therewith, a lever, H, pivotally connected in the open part of the draw-head and having an open right angular bent end moving in the opening I, and a lower bent end approximating a vertical line, the portion of the said lever between the upper angular end and the lower bent end being arranged obliquely, a spring K, adjustably connected to the said lever below its fulcrum point, and a pin having a horizontally disposed circumferential groove adapted to be engaged by the upper angularly extending end of the lever, substantially as described.

In testimony whereof I have signed this specification in the presence of two subscribing witnesses.

MOSES W. NEEDHAM.

Witnesses:
DUNETRIR PUEA,
B. J. BACA.